(12) United States Patent
De Trana et al.

(10) Patent No.: US 6,856,674 B1
(45) Date of Patent: Feb. 15, 2005

(54) PLATFORM FOR PREPAID CALLING CARD CALLS

(75) Inventors: Nicholas D De Trana, Addison, IL (US); Craig L DeCaluwe, Naperville, IL (US); Hossein Eslambolchi, Los Altos Hills, CA (US); Paul Greendyk, Prospect Park, NJ (US); David Caswell McChristian, Naperville, IL (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/328,208

(22) Filed: Dec. 23, 2002

(51) Int. Cl.[7] ............................................ H04M 15/00
(52) U.S. Cl. ............................. 379/114.2; 379/114.01; 379/114.15; 379/114.16; 379/114.17; 379/144.01
(58) Field of Search ....................... 379/114.01, 114.14, 379/114.15, 114.16, 114.17, 114.2, 114.28, 115.01, 115.03, 127.02, 144.01, 188, 189, 191

(56) References Cited

U.S. PATENT DOCUMENTS

| 4,162,377 | A | | 7/1979 | Mearns |
| 5,353,335 | A | | 10/1994 | D'Urso et al. |
| 5,566,235 | A | * | 10/1996 | Hetz ...................... 379/221.02 |
| 5,844,972 | A | | 12/1998 | Jagadish et al. |
| 6,021,189 | A | * | 2/2000 | Vu ......................... 379/114.17 |
| 6,122,354 | A | | 9/2000 | Dowens |
| 6,137,872 | A | | 10/2000 | Davitt et al. |
| 6,188,752 | B1 | * | 2/2001 | Lesley ................... 379/114.16 |
| 6,404,865 | B1 | * | 6/2002 | Springer et al. ....... 379/114.14 |
| 6,404,870 | B1 | * | 6/2002 | Kia et al. .............. 379/144.01 |
| 6,453,029 | B1 | * | 9/2002 | Campbell ................ 379/114.2 |

* cited by examiner

*Primary Examiner*—Quoc Tran (57) ABSTRACT

The present invention is a method and apparatus for providing prepaid card service to customers for placing telephone calls without relying on a post-service billing model. A service management computer having access to a card database is connected to the network only by out-of-band connections. A voice response unit or a tone receiver and announcement player in the network are the voice interface with the customer and are provided at the originating switch in the network to eliminate multiple switches from the call path.

20 Claims, 5 Drawing Sheets

PLATFORM FOR PREPAID CALLING CARD CALLS

FIELD OF THE INVENTION

The present invention relates generally to a prepaid telephone communications service. More specifically, the present invention relates to a simplified platform permitting use of a prepaid calling card for accessing a public switched telephone network.

BACKGROUND OF THE INVENTION

Telecommunications services provided by each telecommunications service provider are usually limited to certain restricted geographical areas. Convenient contractual arrangements involving billing for past services rendered are in place only for those customers usually located in the area served by each service provider. All others must normally use prepay systems such as pay telephones to obtain service. That may be inconvenient for long distance callers, as a large amount of currency or a particular credit card or phone card must be available. Further, an international traveler who is not fluent in the language of the region served by a telecommunications service provider has an additional burden in using the telephone in that instructions in his native language on how to use the telephone are normally unavailable.

Figure 1:
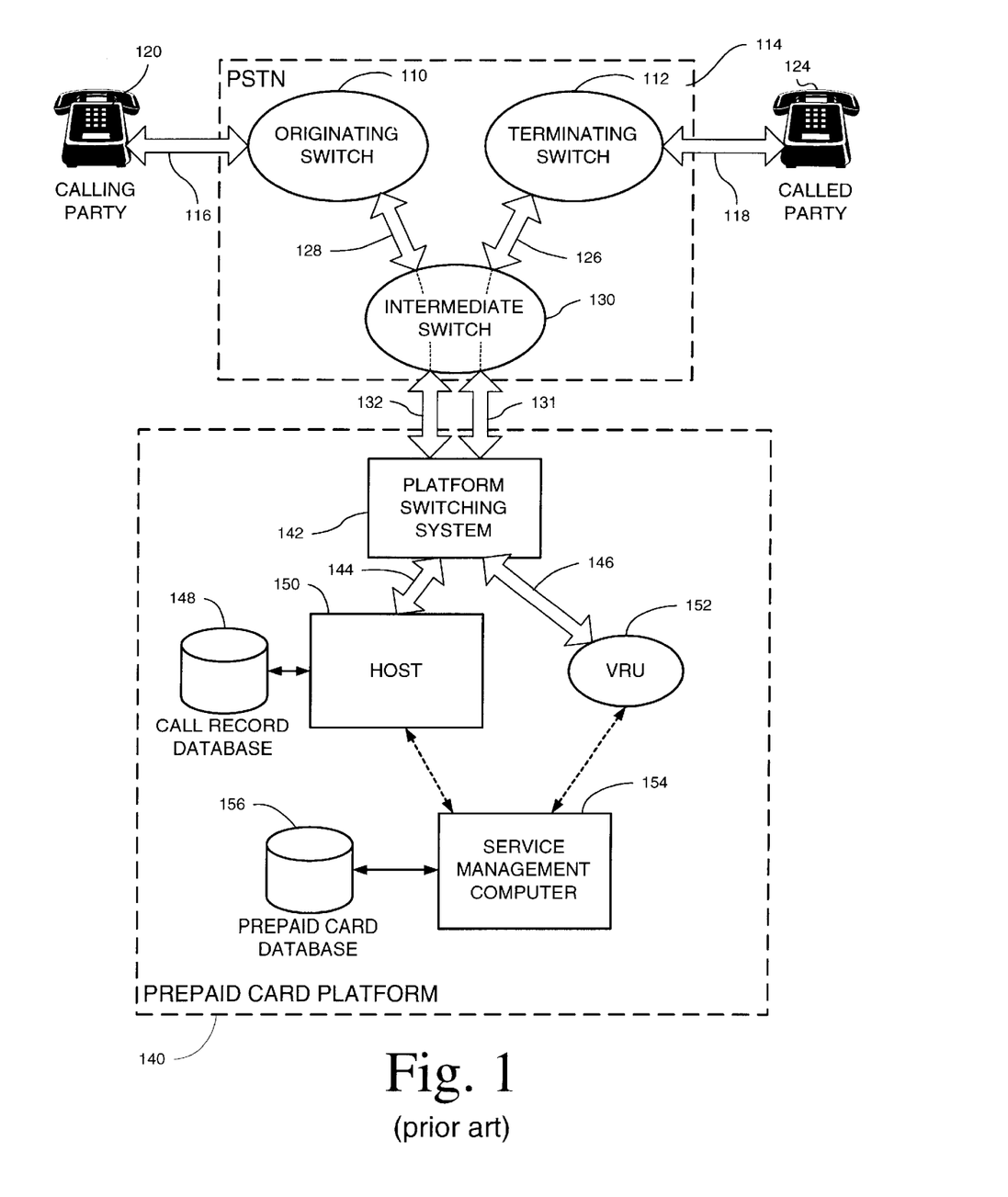
FIG. 1 is a schematic view of a prior art telephone network including a platform for the use of prepaid calling cards.

Pre-paid telephone services based on a pre-paid calling card have been implemented for access through the current Public Switched Telephone Network (PSTN). An example of a current system is illustrated in FIG. 1. A calling party 120 establishes a connection 116 with an originating switch 110 in the PSTN 114. The connection 116 includes an "in-band" connection. An "in-band" connection, as used herein, is a connection capable of carrying a voice frequency, a data stream or other information that is the "primary" conveyance of the network, along with in-band signaling information that is used to establish calls and/or services. Many telephone systems use some form of in-band signaling, wherein tones within the voice frequency band are used to carry signals such as dialed telephone numbers or other switching information. Such signaling occupies bandwidth that could otherwise be used for voice. Many modern telephone systems use, either exclusively or in combination with in-band signaling, out-of-band signaling, wherein information is transmitted via separate facilities or over separate frequency channels or time slots from those used to carry the voice or primary other information. One example of an out-of-band system used widely in telephone systems today is SS7 (ITU Signaling System 7), with associated protocols including ISUP (ISDN User Part) and TCAP (Transaction Capability Application Part). Further references herein to SS7 will be deemed to include those associated protocols. Other vehicles that could be used for out-of-band signaling include ISDN (Integrated Services Digital Network), Frame Relay, ATM (Asynchronous Transfer Mode) and IP (Internet Protocol). The terms "in-band" and "out-of-band" as used herein shall refer generally to signaling transmitted within or outside a primary information-carrying band.

Returning to FIG. 1, the calling party 120 designates the connection 116 as a prepaid call, usually by dialing a number dedicated to that purpose, such as a toll free number having a prefix in the form of "8YY". The originating switch 110 then connects the call through an intermediate switch 130 to a switching system 142 within the prepaid card platform 140. That platform, including its switches and other components, is typically located at a centralized site that may not be near either the calling party 120 or the called party 124. The connection 128 between the originating switch 110 and the intermediate switch 130, and the connection 132 between the intermediate switch 130 and the platform switching system 142, are supported by out-of-band connections. The subsequent information collected by the platform 140 is all done in-band which forces the call to stay connected to that location for the entire length of the call.

The platform switching system 142 connects to a host computer 150 through a connection 144. The host 150 accesses a service management computer 154 to verify the prepaid account using data in a prepaid card database 156 and to decrement the time available in the account as it is used. The host 150 also accesses a call record database 148 for call processing and switching.

The platform switching system 142 sets up a connection 146 with a voice response unit (VRU) 152. The connection 146 includes in-band capacity. A VRU is a menu-driven user interface for exchanging information 'in-band' from a customer connected through a voice telephone. In the present case, the VRU 152 collects a prepaid card number and the called/dialed number from the customer and informs the customer whether the card is valid and how much time is left on the card.

Once it is verified that the prepaid card is valid and has sufficient time for completing a call, the platform switching system 142 establishes a connection 131 through intermediate switch 130 and connection 126 with a terminating switch 112, which connects through connection 118 to the called party 124. Each of the connections 131, 126, 118 have in-band capability.

The connections 126, 128, 131, 132 require two termination points each (one at each end) and consume four extra terminations in the AT&T Network and two extra terminations in the prepaid platform location, along with extra bandwidth.

One example of a system having a platform architecture similar to that described above is described in U.S. Pat. No. 5,353,335, issued Oct. 4, 1994 to D'Urso et al., which is assigned to the same assignee as the present application, and hereby incorporated by reference herein. That patent describes a prepaid telephone system having multilingual capabilities.

Existing prepaid card platforms such as that described with reference to FIG. 1 utilize significantly more bandwidth and switching terminations than a simple station-to-station connection. That is primarily because of the number of connections necessary to route the call through the switching system associated with the prepaid card platform. It is therefore desirable to provide a method and system for placing a prepaid card call that does not consume a large amount of bandwidth and a large number of terminations, while still providing access to a service management computer and the associated databases.

SUMMARY OF THE INVENTION

The present invention addresses those needs by providing a method and apparatus for providing a prepaid telephone communications service. In a method of the invention, a request is received at a first switch to place a prepaid call. A card number is also received. An out-of-band message containing the card number is sent from the first switch to a service management computer. An out-of-band message from the service management computer containing a card validation is received at the first switch. The prepaid call is connected to the destination number.

The method may further include receiving an off-hook message from the destination number; and sending from the first switch to the service management computer an out-of-band message to start a call timer. In that case, the first switch may terminate the call and send to the service management computer an out-of-band message to stop the timer and record usage.

The method may also include receiving from the service management computer an out-of-band message that a balance of the card is below a predetermined threshold, and playing a low balance announcement to the calling party. The announcement may also include an offer to replenish the card balance.

The out-of-band messages may be messages that are sent using SS7, ISDN, Frame Relay, ATM or IP.

The request to place a prepaid call may be a dialed designated number, or may be a dialed toll-free number.

The destination station number may be received before receiving the card validation, or may be received after receiving the card validation.

The method may further include the steps of transmitting an out-of-band message containing data identifying an originating station to the service management computer; and receiving from the service management computer an out-of-band message containing fraud information regarding the originating station.

In another embodiment of the invention, a telephonic switch of a public switched telephone network is provided for placement of a prepaid telephone call originated at the switch by an originating station to a destination station. The switch includes at least one interface for voice band connections with the originating station and the destination station. The switch further includes an interface for an out-of-band signaling connection with a prepaid card service management computer, and memory containing executable code for requesting and receiving from the service management computer account status information for an identified prepaid card, and for transmitting call timer start and stop commands. Finally, the switch includes an interface for a voice band connection with a tone receiving and announcement playing apparatus, the interface being for sending DTMF tones received from the originating station and for receiving at least one instruction for transmission to the originating station regarding the placement of the prepaid telephone call.

The out-of-band signaling connection interface may be an interface utilizing a protocol selected from a group consisting of SS7, TCAP, ISDN, Frame Relay, ATM and IP. The tone receiving and announcement playing apparatus may be a voice response unit.

One of the instructions may be a prompt for a prepaid card number, or a prompt for a destination station number.

The telephonic switch may further comprise memory containing executable code for receiving from the service management computer a decremented balance of a prepaid card according to the call timer. In that case, the executable code may further be for receiving a message when the balance of the prepaid card falls below a predetermined level.

The telephonic switch may further include memory containing executable code for transmitting an identifier of at least one of the originating station telephone number and the destination station number, and receiving fraud information associated with the at least one station.

These and other advantages of the invention will be apparent to those of ordinary skill in the art by reference to the following detailed description and the accompanying drawings.

DETAILED DESCRIPTION

Figure 2:
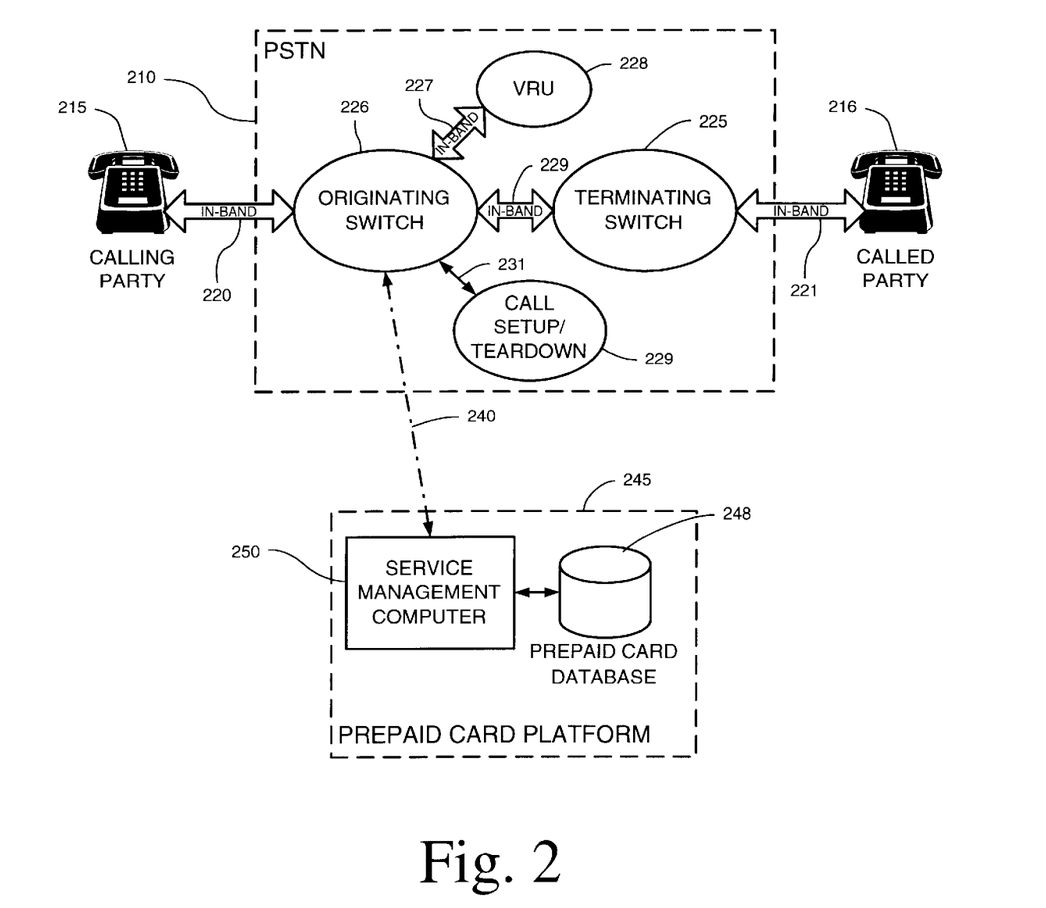
FIG. 2 is a schematic view of a telephone network including a platform for the use of prepaid calling cards according to one aspect of the invention.

Referring to FIG. 2, a prepaid calling card system according to the present invention permits a calling party or originating station 215 to place a telephone call to a called party or destination station 216 without the need for having an established business relationship with a telecommunications service provider involving post-payment for telephone calls and without the need for the caller to have a large amount of currency or a particular credit card that would permit currently available pay phones to be used. The calling party 215 is connected to the called party 216 through one or more nodes in a public switched telephone network (PSTN) 210. The nodes may be comprised of telecommunications switching systems located in a central office. In the illustrated embodiment, those switching systems are represented by originating switch 226 and terminating switch 225. In the illustrated example, calling party 215 is connected to the PSTN via a voice connection 220 to the originating switch 226. One skilled in the art will recognize that other means of access to the originating switch, such as a direct connection and SS7 or via ISDN, may be used while remaining within the scope of the invention.

The switching systems may be in a network provided by a local exchange carrier (LEC). The switching system in the illustrated embodiment may be, for example, a 5ESS® switching system. Alternatively, the switching system may be in a network of a long distance carrier such as AT&T. In that case, the switch may be, for example, an AT&T 4ESS™ switching system. While two switches 225, 226 are illustrated in FIG. 2, a larger number of switches may be involved. The switches are interconnected by voice-band connections such as connection 229. The called party 216 is connected to the PSTN via a connection 221 to the terminating switch 225.

The PSTN 210 also contains a tone receiver and announcement player 228 that is programmed with messages enabling the customer to interact with the prepaid card platform 245 as described below. That receiver and player 228 may, for example, be a VRU or may be a DTMF (Dual Tone Multi Frequency) receiver and an announcement system. Such equipment is commonly incorporated in modern switches. The means for receiving tones and playing announcements will hereinafter be referred to as a VRU. In a preferred embodiment, the VRU 228 is also used by the PSTN for other customer interactions such as the use of a network voice mailbox or other programmable network features requiring the entering of information by the customer. Because VRU's are typically included within the modern PSTN to perform other customer interfacing functions, it is not necessary to procure dedicated VRU's for the prepaid card platform.

A VRU in accordance with the invention is set up to play a welcome greeting, to prompt for and accept a prepaid card number, to prompt for and accept a dialed number, to play messages informing a customer of a card balance or indicating that a card balance is exhausted, to play messages regarding the validity status of a card account, and any other customer interaction required by the prepaid card platform. The VRU 228 is connected to the switching system by connection 227. That connection includes in-band capability for carrying voice and DTMF signaling, as well as out-of-band capability for transmitting the collected information. In a preferred embodiment, that information is forwarded by the originating switch 226 to the service management computer 250. In that way, the originating switch 226 knows when information collection is complete and can keep track of the call progress. In an alternative embodiment (not shown), the VRU is directly linked to the service management computer 250.

Additionally, as is known in the art, the PSTN comprises functionality 229 for setting up and tearing down voice connections. That functionality is contained in the switching systems described above A prepaid card platform 245 handles card verification, record-keeping and other functions of the system. The platform 245 may be a single, centralized grouping of service management computers and associated databases, or may be a distributed system.

The service management computer 250 manages a prepaid card database 248 containing relevant information about each outstanding card, such as the current balance for each card. In addition to managing the prepaid card data base 248, the service management computer 250 also performs operations, administration, and maintenance (OA&M) operations for the platform 245. The service management computer 250 also provides a gateway for remote access to the prepaid services platform 245. For example, there may be a customer support center (not shown) that is capable of reading the information contained in the database 248 and a provisioning system (not shown) that is able to read the information already in the database as well as write other information, such as new card data or a replenishment of a card balance, to the information stored in the card database 248.

The service management computer is capable of accessing information about a particular prepaid card in the database 248 to determine the validity of the card and remaining balance on the card. The balance may be stored in time units or in monetary units.

The service management computer 250 also has the capability of decrementing a card balance in real time based on an in-progress call timer. When the computer receives a message indicating that a prepaid card call has been answered using a particular prepaid card, the computer starts a call timer and begins decrementing the balance of the prepaid card. The service management computer 250 continues decrementing the card balance until either the computer receives a message indicating that the call has terminated, or the card balance is exhausted. If the computer receives a message indicating that the call has terminated, the computer forwards a message containing the card balance to the prepaid card database 248. If the card balance is exhausted during the call, a message indicating that condition is additionally sent to the originating switch. The service management computer may also generate messages indicating that a balance has reached predetermined thresholds, so that an originating switch may warn a customer that a call will be terminated in a certain time period or provide an option to replenish time on the card.

The service management computer 250 is connected directly to the originating switch 226 by an out-of-band connection 240. The term "directly" as used herein in this context means that communications between the originating switch and the service management computer travel the full length of the connection as out-of-band signals. For example, there are no intervening switching systems between the originating switch and the computer through which a message would pass in-band. All messages exchanged between the prepaid card platform and the PSTN are therefore out-of-band signaling messages that occupy relatively little bandwidth on a shared signaling network (e.g. SS7 Network). For example, a low-card-balance warning is generated by the prepaid card platform 245 as an out-of-band signal traveling through connection 240 to originating switch 226. An actual voice warning understandable by a customer is generated locally within the PSTN by a VRU or other announcement system 228, thereby avoiding the necessity of an in-band connection between the prepaid card platform 245 and the originating switch 226. In a preferred embodiment, the message is played by an announcement system in the switch, and the connection 227 to the VRU or announcement system 228 is set up only when communications are required to better utilize announcement and VRU capacity.

The prepaid card platform may also have fraud management capability for detecting and avoiding card fraud. For example, the originating switch may forward ANI information to the service management computer 250 identifying the station used by the calling party 215. That information is forwarded via out-of-band connection 240. The service management computer 250 accesses the prepaid card database 248 to look up whether the originating station has a high incidence of prepaid card fraud. If the service management computer 250 determines that prepaid calls are not allowed from the originating station used by the caller because a high frequency of fraud has been detected from that station, an out-of band message is sent from the service management computer to the originating switch 226, and the originating switch plays an appropriate "deny service" announcement and then disconnects the caller. That announcement is played to the caller by the VRU or announcement system 228 that is accessible by the originating switch 226 within the PSTN 210.

Figure 3A:
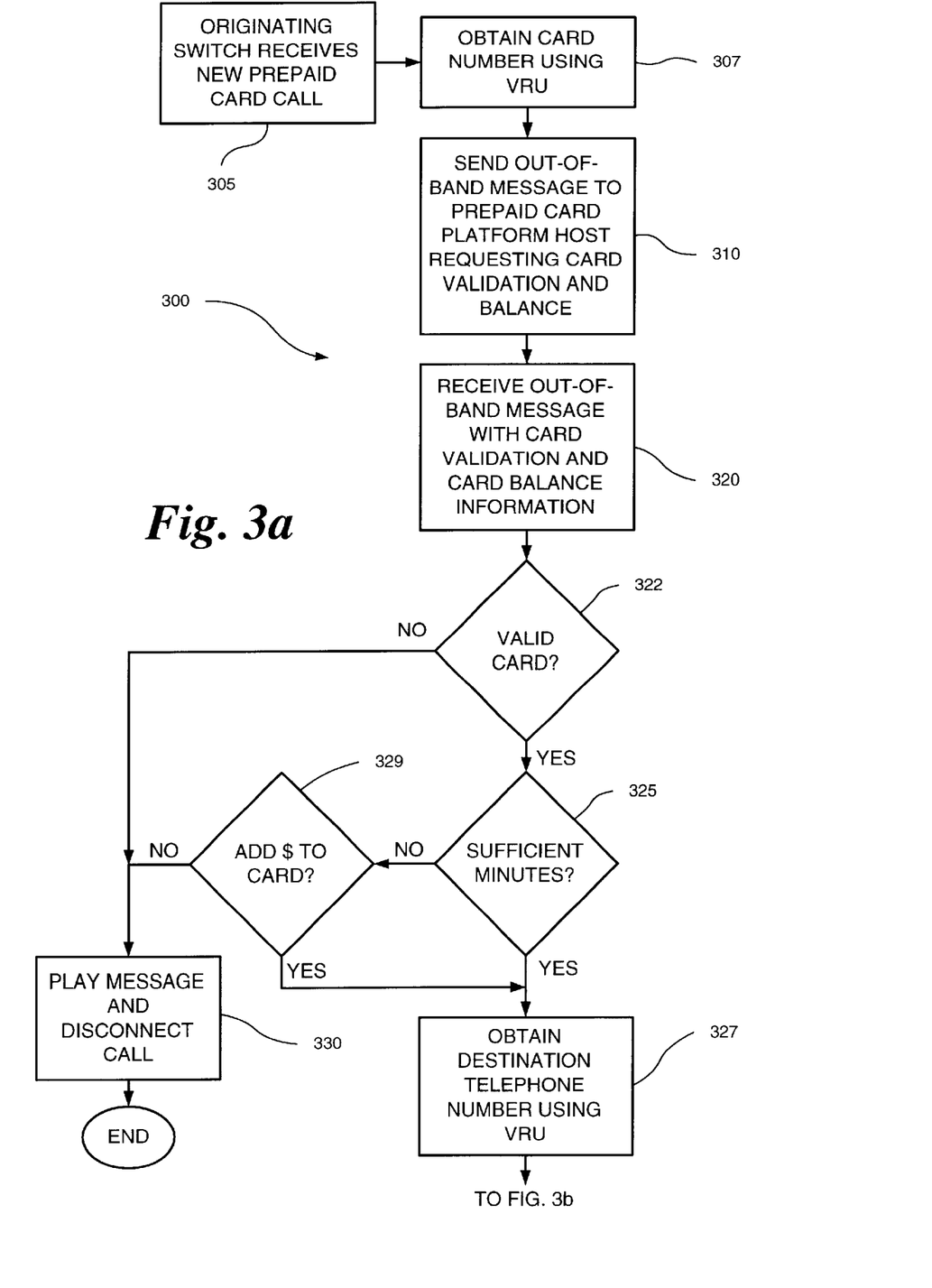
FIGS. 3a, 3b and 3c are block diagrams representing a method according to the invention.
Figure 3B:
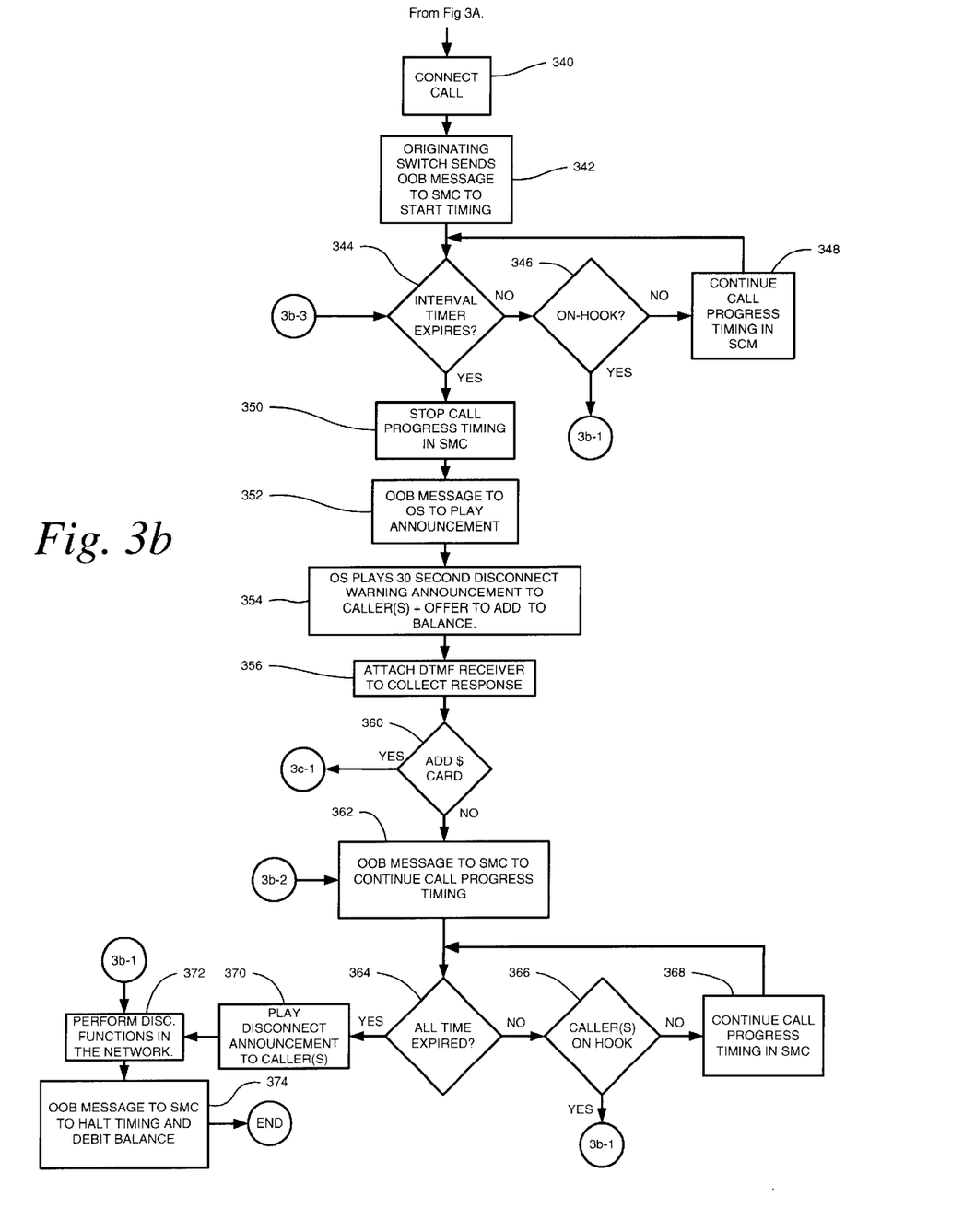
Figure 3C:
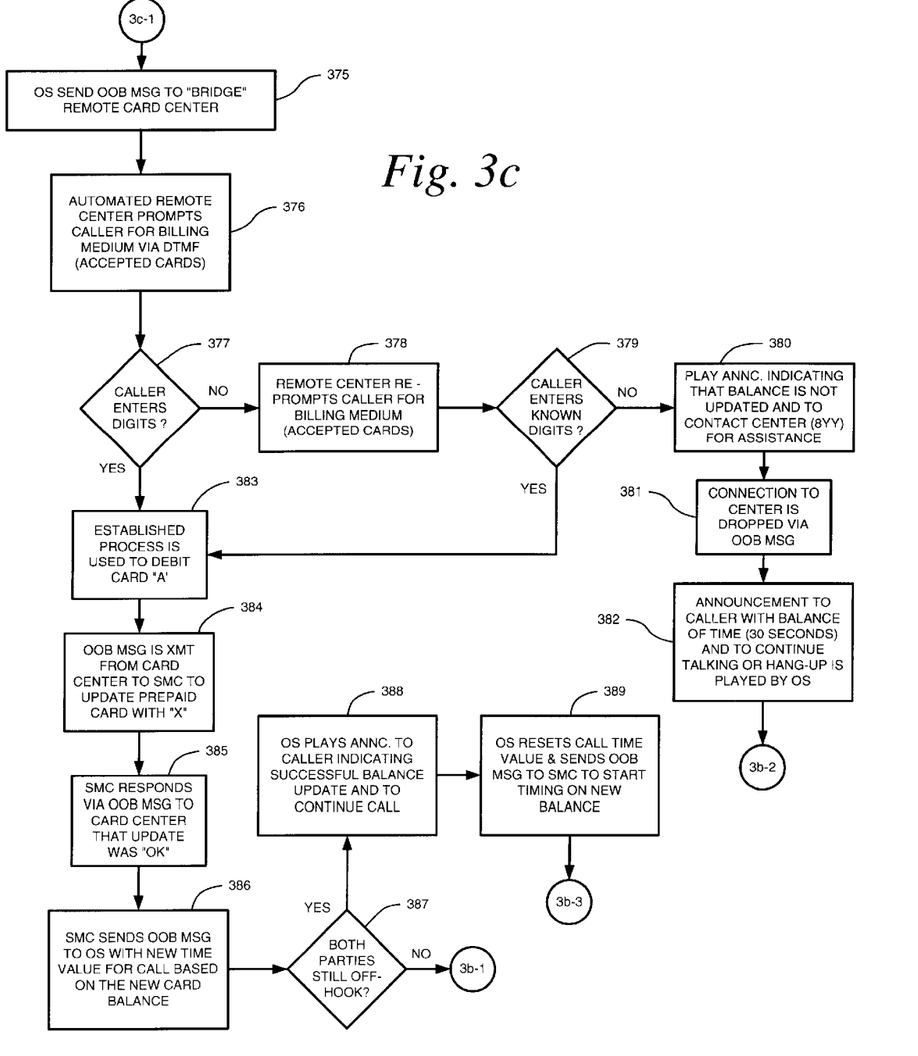

In a method according to the invention shown in FIGS. 3a, 3b and 3c, an originating switch initially receives (step 305) a new prepaid card call. A customer generally places such a call by dialing a toll-free number, such as an 8YY number, that is shown on the prepaid card.

In a preferred embodiment, the originating switch establishes a connection with a VRU for requesting and receiving from the customer a card number or other identification (step 307). The VRU may also request and receive the destination telephone number at that stage.

The originating switch then sends (step 310) an out-of-band message to the prepaid card service management computer requesting a card validation check and a check of the credit card balance. Those checks are performed by the service management computer by accessing the prepaid card database. The originating switch then receives (step 320) from the service management computer an out-of-band message containing the results of the card validation check and card balance check.

If the card is invalid (step 322), then the originating switch transmits a request to a VRU to play (step 330) a message stating that the call cannot be completed, and disconnects the call. If a valid card contains a balance less than some predetermined minimum for making a call (step 325), a message may be played to offer to the customer to increase the balance on the card by purchasing additional minutes using a credit card or other means (step 329). If the customer chooses not to do so, the originating switch plays a message and disconnects the call (step 330).

If the card is valid and contains a balance greater than the predetermined minimum for making a call (step 325), or sufficient time has been added to the card (step 329), then the originating switch obtains the destination telephone number (step 327) if that step has not already been done, and, as shown in FIG. 3b, connects the call (step 340). Optionally, the originating switch requests and receives (not shown) verification from the service management computer that the destination number is a valid destination number for the card being used (e.g., domestic long distance).

At the time the call is answered, the originating switch sends (step 342) an out-of-band message to the service management computer to start a call timer. To monitor card balance, the service management computer starts an interval timer set to expire at a fixed time, such as 30 seconds, ahead of exhaustion of the card balance. The timer is monitored (step 344) and the connection is monitored for an on-hook condition (step 346). If the timer is not expired and the connection remains off-hook, the call progress timing continues in the service management computer (step 348). It is significant that the monitoring is done without an in-band connection to the prepaid card platform. Instead, simple "start timer" and "stop timer" instructions are transmitted to the service management computer via out-of-band connections.

While, in the illustrative embodiment, the call timer is located in the service management computer, the timer may alternatively be located elsewhere, such as in the originating switch, or in both the originating switch and the service management computer. One advantage of locating the timer in the service management computer is having a capability to simultaneously monitor more than one call using the same card.

If the card balance is depleted during the conversation, or, in the illustrated embodiment, falls below some predetermined minimum balance, the service management computer stops call progress timing (step 350) and sends (step 352) a message to the originating switch indicating that the time is low or depleted. In response to that message, the originating switch, utilizing the VRU, plays (step 354) a message to the customer warning that the time is nearly or fully depleted. As shown in the illustrated embodiment, the originating switch may also, at that time, play a message to the customer offering to replenish the card balance through a credit card or other transaction. In that case, the originating switch attaches (step 356) a DTMF receiver, such as VRU described above, to receive DTMF signals representing the caller's choice in whether to add to the balance of the card. If the caller chooses (step 360) not to do so, the originating switch sends (step 362) an out-of-band message to the service control computer to continue call progress timing. The system then monitors whether the remaining time is exhausted (step 364) and whether a party has gone on-hook (step 366), looping back (step 368) until one of those conditions is met. When time runs out, the switch plays an announcement (step 370), disconnects the call (step 372) and sends an out-of-band message (step 374) to the service management computer to halt timing and debit the card balance, stating the reason for the disconnection. If a party has gone on-hook (step 366) the switch disconnects the call (step 372) and sends an out-of-band message (step 374) to the service management computer to halt timing and debit the card balance.

In many cases, the call will be terminated by the parties (step 346) before the disconnect warning is played. In that case, disconnect functions are performed by the network (step 372) and the originating switch sends (step 374) an out-of-band message to the service management computer to stop the timer and debit the card balance.

Because no voice-band connections are established to and from the prepaid card service management computer 250, the utilized bandwidth and switch terminations for a prepaid card call are greatly reduced. Instead, the method and apparatus of the present invention take advantage of the out-of-band signaling capabilities of the existing network for exchanging information with the prepaid card platform.

If the caller elects to supplement the balance of the prepaid card (step 360), a method such as that shown in FIG. 3c is invoked. The originating switch sends an out-of-band message (step 375) to "bridge" a remote card center to the call. As is known in the art, the remote card center (not shown) may include a management computer, a database and interfaces to financial networks. The remote card center is capable of validating and debiting various billing media such as credit cards, debit cards and dedicated accounts.

The remote card center prompts (step 376) the caller for billing medium information, such as a credit card number, to be input by the caller via DTMF tones, voice recognition or another input method. The caller then attempts to enter a correct number (step 377). If the attempt fails, the remote center reprompts (step 378) and the caller re-attempts (step 379) entry of a valid billing medium. If the caller is still unable to enter a valid number, an announcement is played (step 380) indicating that the balance has not been updated and suggesting that the caller contact the remote card center for assistance. The "bridge" connection to the remote card center is then dropped (step 381) and an additional announcement is played (step 382) to the caller informing the caller of the current prepaid card balance. The service management computer then continues to monitor call progress (step 362).

If the caller successfully enters a valid billing medium, that medium is debited (step 383) as is known in the art. An out-of-band message is transmitted from the remote card center to the service management computer to update (step 384) the prepaid card with the purchased amount, in either minutes or currency. The service management computer responds (step 385) with an out-of-band message to the remote card center that the balance update was performed. The service management computer then sends (step 386) an out-of-band message to the originating switch, relaying a new time value based on the new card balance. At that point, if either party has hung up (step 387), disconnect functions are performed by the network (step 372). If both parties are still on the line, the originating switch plays an announcement (step 388) to the caller indicating that there was a successful balance update and the call may be continued. The originating switch resets (step 389) the call time value and sends an out-of-band message to the service management computer to start timing (step 344) on the new balance.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for providing a prepaid telephone communications service, comprising the steps of:

receiving at a first switch a request to place a prepaid call and a card number;

sending from the first switch to a service management computer an out-of-band message containing the card number;

receiving at the first switch an out-of-band message from the service management computer containing a card validation;

receiving at the first switch a destination station number;

connecting the prepaid call to the destination number, and sending from the first switch to a service management computer an out-of-band message to start a call timer associated with the prepaid call;

receiving from the service management computer an out-of-band message that a balance of the card is below a predetermined threshold, and stopping the call timer;

playing a low balance announcement to the calling party including an offer to replenish the card balance or make a connection for supplemental payment authorization from a different card center; and upon confirming with out-of-band messages such replenished card balance or such supplemental payment authorization, restarting the call timer.

2. The method of claim 1, further comprising the steps of:

receiving an off-hook message from the destination number; and sending from the first switch to the service management computer an out-of-band message to start the call timer.

3. The method of claim 2, further comprising the steps of:

terminating the call; and sending from the first switch to the service management computer an out-of-band message to stop the timer and record usage.

4. The method of claim 1, further comprising the steps of receiving from the service management computer an out-of-band message that a balance of the card is depleted;

terminating the call and sending from the first switch to the service management computer an out-of-band message to stop the timers record usage and the reason for terminating the call.

5. The method of claim 1, wherein the out-of-band messages are messages that are sent using a system selected from a group consisting of SS7, ISDN, Frame Relay, ATM and IP.

6. The method of claim 1, wherein the request to place a prepaid call is a dialed designated number.

7. The method of claim 1, wherein the request to place a prepaid call is a dialed toll-free number.

8. The method of claim 1, further comprising the steps of:

transmitting an out-of-band message containing data identifying an originating station to the service management computer; and receiving from the service management computer an out-of-band message containing fraud information regarding the originating station.

9. The method of claim 1 wherein the service management computer includes the timer, said service management computer simultaneously monitoring more than one prepaid call charged to the same card number.

10. The method of claim 1 further comprising sending out-of-band messages to start or stop the timer.

11. A telephonic switch of a public switched telephone network, for placement of a prepaid telephone call originated at the switch by an originating station to a destination station, the switch comprising:

at least one interface for connections with the originating station and the destination station;

an interface for an out-of-band signaling connection with a prepaid card service management computer;

memory containing executable code for requesting and receiving from the service management computer account status information for an identified prepaid card, and for transmitting to the service management computer call timer start and stop commands said call timer stop command including stopping the timer to allow the originating station to replenish the card balance or make a connection for supplemental payment authorization from a different card center, said call timer start command including starting the timer upon confirming with out-of-band messages such replenished card balance or such supplemental payment authorization; and an interface for a voice band connection with a tone receiving and announcement playing apparatus, the interface being for sending DTMF tones received from the originating station and for receiving at least one voice instruction for transmission to the originating station regarding the placement of the prepaid telephone call.

12. The apparatus of claim 11, wherein the out-of-band signaling connection interface utilizes a protocol from a group consisting of SS7, ISDN, Frame Relay, ATM and IP.

13. The apparatus of claim 11, wherein the tone receiving and announcement playing apparatus is a voice response unit.

14. The apparatus of claim 11, wherein one of the at least one instructions is a prompt for a prepaid card number.

15. The apparatus of claim 11, wherein one of the at least one instructions is a prompt for a destination station number.

16. The apparatus of claim 11, further comprising memory containing executable code for receiving a message from the service management computer when the balance of the prepaid card falls below a predetermined level.

17. The apparatus of claim 11, further comprising memory containing executable code for transmitting to the service management computer an identifier of at least one of the originating station telephone number and the destination station number, and receiving from the service management computer fraud information associated with at least one station.

18. The apparatus of claim 17, wherein the account status information includes authorization information for international calling.

19. The apparatus of claim 11 wherein the service management computer includes a timer, said service management computer simultaneously monitoring more than one prepaid call charged to the same card number.

20. The apparatus of claim 11 wherein the service management computer processes out-of-band messages to stop the timer, record time usage for the prepaid telephone call and the reason for terminating the call.

* * * * *